United States Patent
Schumacher et al.

(10) Patent No.: US 6,453,945 B1
(45) Date of Patent: Sep. 24, 2002

(54) COUPLING FOR MULTIPLE HYDRAULIC PIPES

(75) Inventors: Gustav Schumacher, Gartenstrasse 8, D-57612, Eichelhardt (DE); Friedrich-Wilhelm Schumacher, Eichelhardt (DE)

(73) Assignee: Gustav Schumacher, Eichelhardt (DE)

( * ) Notice: Subject to any disclaimer, the term of this patent is extended or adjusted under 35 U.S.C. 154(b) by 0 days.

(21) Appl. No.: 09/697,533

(22) Filed: Oct. 26, 2000

(30) Foreign Application Priority Data

Oct. 28, 1999 (DE) .......................... 199 51 885

(51) Int. Cl.[7] .............................................. F16L 37/28
(52) U.S. Cl. ........................ 137/614.06; 137/614.04
(58) Field of Search ................... 137/614.06, 614.05, 137/614.04, 614.03, 614

(56) References Cited

U.S. PATENT DOCUMENTS

| | | | |
|---|---|---|---|
| 3,710,823 A | * 1/1973 | Vik | 137/614.06 X |
| 4,074,698 A | * 2/1978 | Hobson et al. | 137/614.04 |
| 5,095,947 A | * 3/1992 | Weh et al. | 137/614.06 |
| 5,316,033 A | 5/1994 | Schumacher et al. | |
| 5,464,042 A | * 11/1995 | Haunhorst | 137/614.04 X |
| 5,934,319 A | * 8/1999 | Schumacher | 137/614.06 |
| 5,988,697 A | * 11/1999 | Arosio | 285/124.1 |

FOREIGN PATENT DOCUMENTS

| | | |
|---|---|---|
| DE | 4318840 C2 | 9/1994 |
| DE | 4338665 A1 | 10/1994 |
| EP | 0 522 493 B1 | 1/1993 |
| EP | 0 686 801 A1 | 12/1995 |

* cited by examiner

Primary Examiner—Kevin Lee
(74) Attorney, Agent, or Firm—Harness, Dickey & Pierce, P.L.C.

(57) ABSTRACT

A coupling for several hydraulic pipes has a number of single couplings which have a first coupling member (2) and a second coupling member (4). The first coupling member (2) includes a first valve (8) and a first cylindrical face (16). The cylindrical face starts from the first front face (7). An actuating element moves the first valve (8) into an open position. A sealing sleeve (17) is adjustable on the first cylindrical face (16) in the direction of a longitudinal axis (x). The sleeve (17) is displaceable by the actuating element from a retracted position, beyond the first front face (7), into a partly projected position. A second coupling member (4) has a second valve (27) and a second cylindrical face (31). The second cylindrical face (31) is at least partly covered by the sealing sleeve (17) in the projected position. The first coupling member (2) is attached to a first block housing (1). The second coupling member (4) is attached to a second block housing (3) in a position corresponding to the first coupling member (2) which are attached to the first block housing (1).

8 Claims, 5 Drawing Sheets

COUPLING FOR MULTIPLE HYDRAULIC PIPES

CROSS-REFERENCE TO RELATED APPLICATION

This application is based upon and claims priority to German Patent Application 1 99 51 885.8 filed Oct. 28, 1999, which application is herein expressly incorporated by reference.

BACKGROUND OF THE INVENTION

The invention relates to a coupling that couples several hydraulic pipes and has a number of single couplings corresponding to the number of the to be connected pipes. The single coupling includes, in a known manner, two coupling members, a connector and a muff to receive the connector.

In mobile hydraulics, several hydraulic pipes have to be connected and disconnected from one another. Normally a basic vehicle has hydraulic pumps and control valves and various attachable equipment which include hydraulic drives that are supplied with hydraulic energy. If such attachable equipment is connected to the basic vehicle, for example a tractor, up to ten hydraulic pipes may be attached to the hydraulic system. To facilitate the coupling processes, several individual (single) hydraulic couplings are connected to a multi-coupling. Accordingly, several single hydraulic coupling members are installed in a common housing block. Connection means are connected to a second housing block which correspond to second coupling members. Often lever connections are used so that, with a single connection lever, several pipes can be connected to each other. One advantage of the couplings is that several hydraulic pipes, via single couplings, are coupled at the same time. Also, the coupling eliminates any confusion of the pipes of the two housing blocks being connected to each other in the wrong position. If a connection error takes place, dangerous malfunction may take place in the attaching equipment. This may lead to equipment damage.

A further problem exists in the couplings of hydraulic pipes. The problem is that the coupling is coupled against a back pressure in one or in two pipes. A very high pressure can build up due to different temperatures in the consumer pipe, the consumer pipe usually being the male coupling member. Also, a very high pressure may be present in the coupling muff, which is often connected by a pipe to the control valve and the pressure supply. During coupling of such hydraulic lines, which are highly pressurized, the pressure increases to such a high level that a coupling-in process is only possible by applying a higher force. During coupling, soft seals such as O-rings are attacked by the pressure medium which flows under high pressure. Leakages may occur. In couplings that have several single couplings that are coupled at the same time, the necessary coupling force is correspondingly multiplied. Then correspondingly stable tensioning levers, as they are for example disclosed in EP 0 522 493 B1 or DE 43 38 665 A1, are necessary to achieve such forces.

EP 0 686 801 A1 discloses a flat valve coupling, which is supposed to be suitable to protect the seals from destruction by a medium passing the seals. However, in this design, fluid has to be displaced during the coupling process and the coupling forces are correspondingly high.

To avoid the coupling problem under pressure, single couplings are used more often, in which the valves of the single coupling members are only opened after the coupling process. To open the valves, a lever mechanism is provided. The lever is actuated after coupling of the coupling members. Here, the real coupling process is easier, even if the pipes are under pressure. This is due to the fact that an opening of the valves does not take place during coupling, but only afterwards by a lever mechanism. The problem of coupling under pressure is practically solved, as for example disclosed in DE 43 18 840 C2. Here, a switching pin is provided which is axially displaced by a cam-like switching element. Thus, both valves of both coupling members are opened. A design of a flat connector can be selected for this type of coupling. Thus, during coupling, the coupling is oil leakage-free as the coupling valves are closed before coupling or decoupling.

SUMMARY OF THE INVENTION

It is an object of the present invention to provide couplings that are connected to a multi-coupling which secure simple coupling and decoupling and are oil leakage-free during coupling and decoupling.

This object is solved according to the invention by a coupling for coupling several hydraulic pipes that has a number of single couplings corresponding to a number of the to be connected pipes. Each coupling includes a first coupling member with a first valve having a first front face, to which the first valve is to be opened. Each coupling has a first cylindrical face, starting from the first front face. Each coupling has an actuating element that transfers the first valve into an open position. Each coupling has a sealing sleeve that is adjustable with a bore on the first cylindrical face in the direction of a longitudinal axis. The sleeve is displaceable by the actuating element from a retracted position into a projected position partly projected beyond the first front face. Each coupling includes a second coupling member that includes a second valve with a second front face to which the second valve is to be opened. Each coupling has a second cylindrical face at least partly covering the sealing sleeve in the projected position.

A first block housing is included which receives the first coupling members. A second block housing is included which receives the second coupling members in a position corresponding to the first coupling members. The second block housing is attachable to the first block housing.

The actuating element, over a first adjusting path, only adjusts the sealing sleeve to the projected position. In a subsequent second adjusting path, the actuating element displaces the first valve into the open position. Accordingly, a sealed connection is achieved before opening the first valve and second valve, which opening takes place at the same time.

The sealing sleeve in its bore has two sealing rings. The rings are arranged at a distance to each other to seal towards the first cylindrical face and the second face.

In a further embodiment, an adjustment spring is provided. The spring returns the sealing sleeve into the retracted position. The displacement into the projected position takes place against the force of the adjustment spring. If a closing of the first valve takes place via the actuating element, the sealing sleeve returns under the effect of the adjustment spring into the retracted position.

If the actuating element is designed as a pivot lever, pivoting moves the first valve from the closed position into the open position or vice versa. A cam disc impinges a collar of the sealing sleeve to displace it into the projected forward position. The cam disc is designed so that a first displacement of the sealing sleeve takes place to its final projected position via a predetermined rotational path or pivoting path of the actuating element. Afterwards, no further displacement takes place. To retain the projected position of the sealing sleeve, the cam disc has an adjustment circumferential contour. The contour extends around the axis of rotation of the actuating element formed as an actuating lever along an arc of a circle. The radius of the arc is kept constant. In using the adjustment mechanism described in U.S. Pat. No. 5,316,033, it is advantageous that free travel is given via a predetermined pivoting path between the switching element, which impinges the valve to be opened, and the actuating element, adjusted by this and which comprises a switching shaft. The switching shaft can be used to adjust the sealing sleeve. During further pivoting of the actuating element or the actuating lever, an adjustment of the switching element takes place. Thus, the first valve is displaced into the open or into the closed position. When moving from the open position into the closed position a passing of the free travel also takes place, and then the closing of the first and the second valve occurs. After this the adjustment spring becomes effective, so that the sealing sleeve is returned into its original position.

Two arrangements in the two block housings can be selected. In the first arrangement, the two coupling members of the single couplings are directly opposed to each other and support each other. However, in the connection of several coupling units or single couplings at the same time, corresponding pressures are active. Accordingly, it is possible that one or several coupling members are under high pressures while the neighboring couplings are not. This results in a load unbalance, which additionally loads the connection elements for the two block housings. To minimize these loadings, a further embodiment of the invention provides a sealing sleeve in the projected position which engages, extends into, an annular chamber formed between the second cylindrical face of the second coupling member and a bore of the second block housing.

In the second arrangement, the first block housing is formed by separate parts and has a cover plate. The second block housing abuts the cover plate of the first block housing in the connected condition. Therefore, a direct support of the two block housings takes place. The coupling members are not supported on each other. Accordingly, deformation is prevented. The existing sealing sleeves and the selected actuation lead to no leakage when the two coupling members are not abutting one another.

One large problem of all hydraulic couplings is that they can get dirty, especially when used in agricultural equipment. In quick connection couplings, where one coupling member is formed as a connector, and inserted into a second coupling member formed as a muff, and held by retaining balls which engage a sliding sleeve, it is difficult to keep the relatively narrow inlet opening of the muff clean. If after decoupling of a connector the inlet is not closed-up by special sealing caps or if these are defective, it is difficult to clean the inlet. If they cannot be cleaned, penetrated dirt will also be locked in during the coupling process and enter the hydraulic pressure medium. The danger of contamination is especially high in mobile hydraulics since the equipment is often used on building sites and it is extensively spread in agriculture. In such multi-couplings, comprising several single couplings, the danger also exists, that contaminations are locked in during coupling. Cleaning is easier since a whole row of individual coupling members need not be checked and if necessary to be cleaned during each coupling. The majority of multi-couplings are provided with flat valve connectors. Thus, the individual locking elements, which make the access difficult, can be deleted. To prevent damage or contamination of the second cylindrical face of the second coupling member, a protective sleeve is provided and adjustably inserted in the annular chamber. The protective sleeve has an end face, which, in the projected position, is flush with the second front face. The protective sleeve is impinged on by a spring to take up this projected position. Further, the protective sleeve is displaceable by the sealing sleeve into a retracted position.

From the following detailed description, taken in conjunction with the drawings and subjoined claims, other objects and advantages of the present invention will become apparent to those skilled in the art.

BRIEF DESCRIPTION OF THE DRAWINGS

Preferred embodiments of the present invention are shown schematically (diagrammatically) in the drawings wherein.

DETAILED DESCRIPTION OF THE PREFERRED EMBODIMENT

Figure 1:
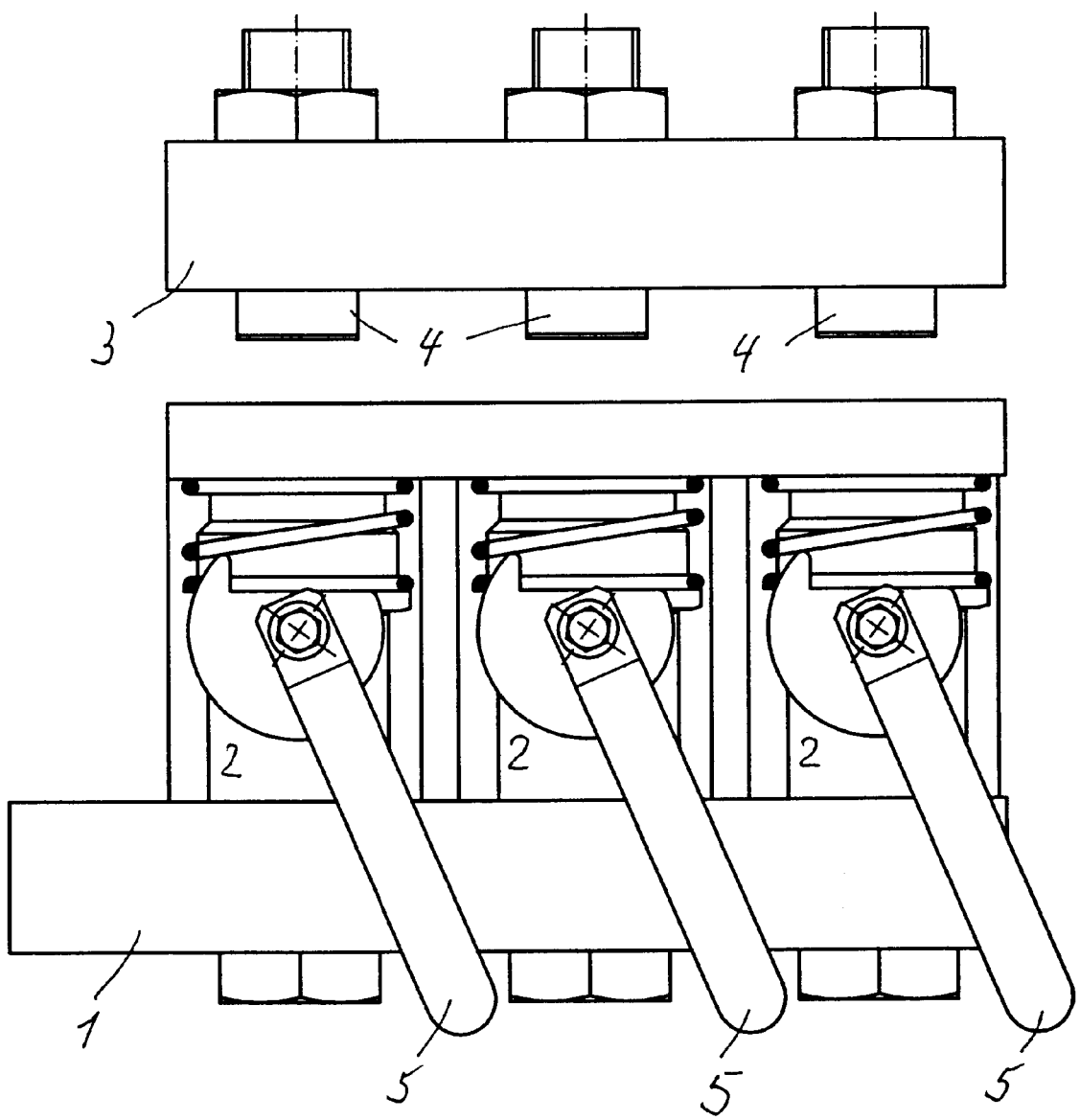
FIG. 1 is a schematic view of a three coupling member arrangement arranged in a block housing and to be coupled to each other.

FIG. 1 illustrates a first block housing 1 with three first coupling members 2. Each of the three first coupling members 2 include an actuating element 5. The actuating element 5 is a pivoting lever, pivotable around an axis of rotation. Each first coupling member 2 has a first valve 8. The first valve 8 can be pushed by the actuating element 5 arranged on the first coupling member 2 into an open or closed position. Second coupling members 4 are opposed to the first coupling members 2. The second coupling members 4 are mounted in a second block housing 3 in a position corresponding to the arrangement position of the first coupling members 2. The two block housings 1 and 3 can be connected to each other, via non represented connection means, for example by connection levers, as they are known from the art.

FIGS. 2–5 show a first embodiment referring to the more detailed design of the two coupling members. As all the three first coupling members 2 and the second coupling members 4 of FIG. 1 are formed in the same way, only one coupling unit comprising a first coupling member 2 and a second coupling member 4 are described and are representative for all.

The first coupling member 2 is received in a recess in the first block housing. A first valve 8 is arranged in the first coupling member 7. The first coupling member 2 includes a first housing 6 having a first front face 7. The first valve 8 is arranged towards the first front face 7. The first valve 8 has a first valve body 11 that abuts a first valve seat 12 in the first housing 6. The front face of the first valve body 11 is flush with the first front face 7 of the first housing 6.

A switching element 9 is swivelable received in the first housing 6. The switching element 9 is penetrated by a switching shaft 10. A breakthrough is provided for this in the switching element 9. The switching shaft 10 abuts the boundaries of the breakthrough of the switching element 9 by abutment faces which enable a free travel between the two. The switching element 9 impinges, during a rotational adjustment of the switching shaft 10, on a switching pin 14 and a pressure bar 13. Due to the rotation, the switching pin 14 is pushed forward beyond the first front face 7 to the front. The valve body 11 is lifted off the seat 12 by the pressure bar 13. Therefore the first valve 8 is in the open position, as shown in FIG. 3.

Figure 2:
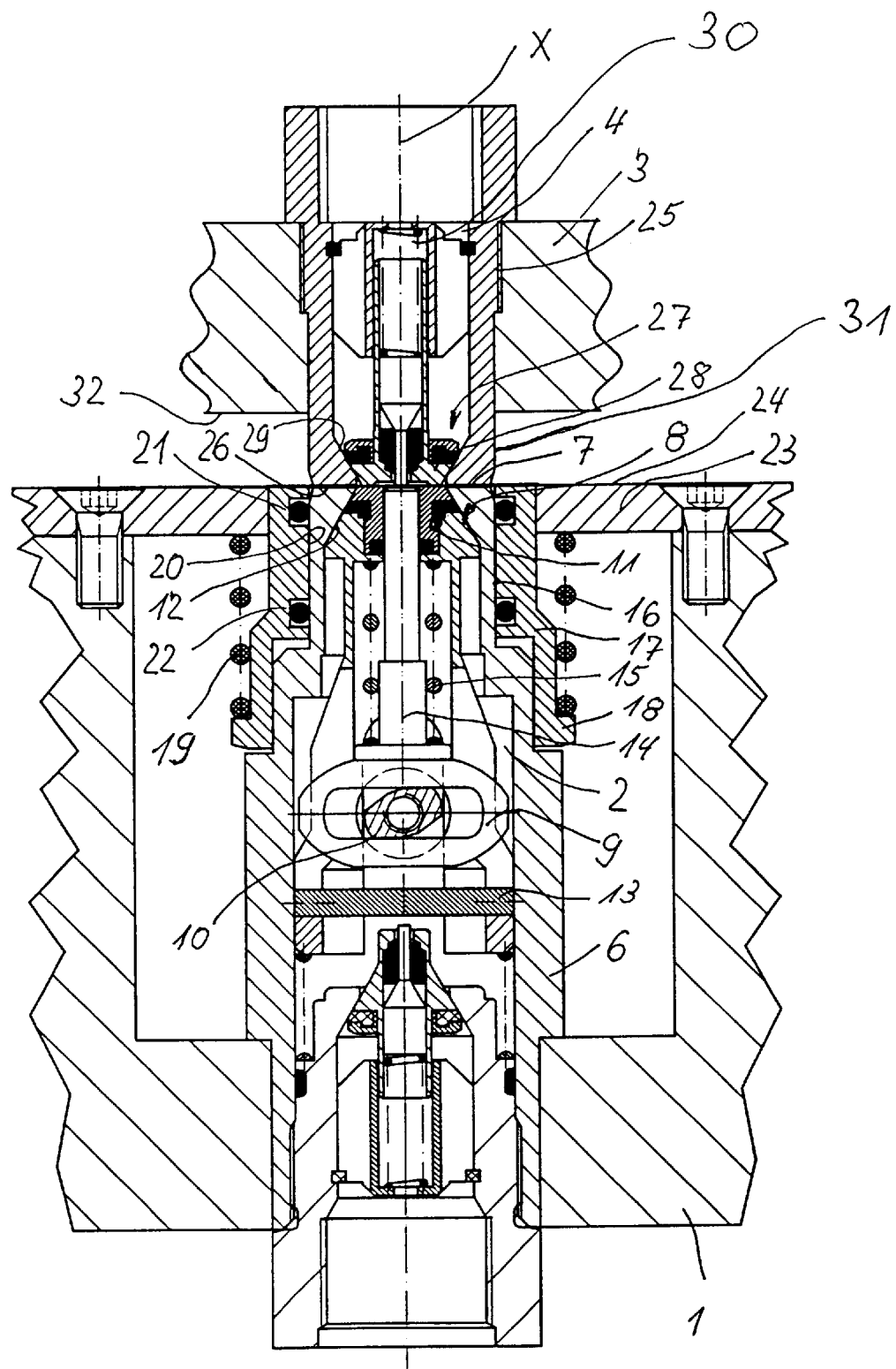
FIG. 2 is a cross-sectional view through a coupling unit to be connected likewise to each other, after fixing the two block housings to each other, however before the actual opening of the two valves of the coupling members.

A sealing sleeve 17 is arranged axially slidable along the longitudinal axis x on the first cylindrical face 16 of the first housing 6. In FIG. 2, it is in the retracted position, where its front face terminates flush with the first front face 7. At its other end the sealing sleeve has a collar 18. An adjustment spring 19 is arranged between the collar 18 and a cover plate 23 of the block housing 1. The spring 19 causes the sealing sleeve 17 to take its retracted position, as shown in FIG. 2. Two sealing rings 21, 22, spaced in the bore 20 of the sealing sleeve 17, both contact the first cylindrical face 16 in the retracted position of the sealing sleeve 17 according FIG. 2.

A second coupling member 4 is stationarily positioned in the second block housing 3. The second coupling member 4 opposes the first coupling member 2. The second coupling member 4 has a second housing 25. The second front face 26 of the second housing 25 is supported on the first front face 7 of the first housing 6. A second valve 27 is arranged in the second housing 25. A valve body 28 of the second valve 27, according to FIG. 2, is in the closed condition. The valve body 28 abuts against the second valve seat 29 due to the force of the second closing spring 30. The second housing 25 projects over the front face 32 of the second block housing 3, so that a second cylindrical face 31 lies free. No contact exists between the front face 32 and the opposed face 24 of the cover plate 23.

Figure 3:
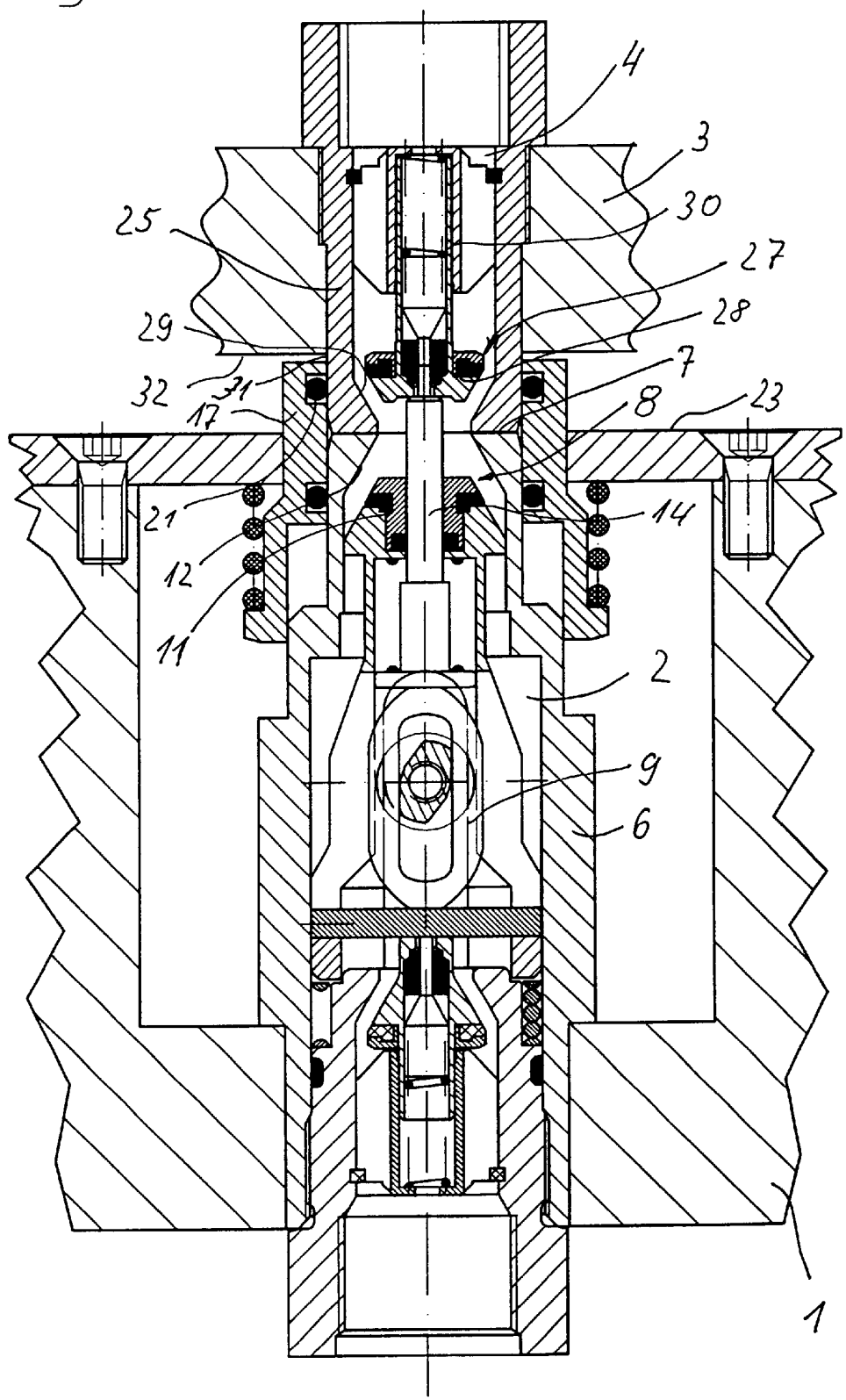
FIG. 3 is a view similar to FIG. 2, where the two coupling members completely couple and the two valves of the coupling members open.

Starting from the position shown in FIG. 2, if a rotational movement of the switching element takes place, moving into the position shown in FIG. 3, the switching pin 14 is pushed beyond the first front face 7. The switching pin 14 impinges on the valve body 28 of the second valve 27. The second valve body 28 is displaced into the open position. The second valve body 28 forms an opening towards the second front face 26. At the same time, the first valve body 11 is lifted off the first valve seat 12. The valve body 11 is in the open position in FIG. 3. The displacement of the sealing sleeve 17 takes place before this movement. Accordingly, the sleeve 17 projects beyond the first front face 7 and is pushed at the same time over the second cylindrical face 31. At the same time, the sealing ring 21 extends over the second cylindrical face 31. Thus, a complete seal between the first housing 6 and the second housing 25 is achieved. Accordingly, an exchange of fluid between the two coupling members 2, 4 may take place. The pressure fluid cannot exit to the outside. During displacement, the sealing sleeve 17 enters the free space between the face 23 and the front face 32.

Figure 4:
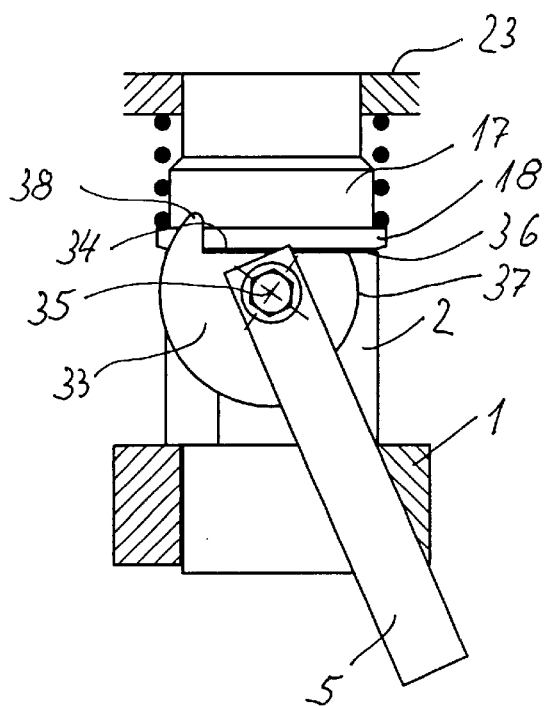
FIG. 4 is a schematical view of the actuating element with the cam disc for setting of the sealing sleeve.
Figure 5:
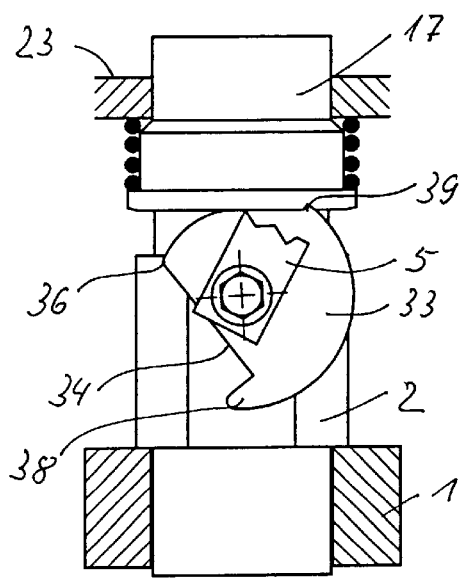
FIG. 5 is a view according to FIG. 4 where the actuating element is in a second position.

The actuation of the sealing sleeve 17 becomes obvious from FIGS. 4 and 5. A switching position of the actuating element 5 and the sealing sleeve 17 is given in FIG. 4, which corresponds to the one of FIG. 2. The switching position of the actuating element 5 in FIG. 5 corresponds to the position of the sealing sleeve 17 and the valve position of the first valve 8 of FIG. 3. However in both the representation the second coupling member has been omitted. Also, FIGS. 4 and 5 are represented in a smaller scale than FIGS. 2 and 3.

The actuation element 5 is in the form of a hand lever sitting on the switching shaft 10, shown in FIG. 2. The switching shaft 10 carries a cam disc 33 on it outside. The cam disc 33, together with the actuation element 5, is swivelable around the axis of rotation 35. The axis of rotation is represented by the axis of rotation of the switching shaft 10. Starting from the position shown in FIG. 2, the setting face 34 is flush with the face 36 of the collar 18 of the sealing sleeve 17. A portion of the circumference of the cam disc 33 has a constant radius and extends concentrically around the axis of rotation. This portion terminates in a face non visible in FIG. 4. The starting position is limited by an abutment 38. When starting from the position shown in FIG. 4, the actuation element 5 is rotated counter-clockwise around the axis of rotation. The setting face 34 acts upon the collar face 36 and displaces the sealing sleeve 17 from its represented retracted position to a projected position shown in FIG. 5. Initially, displacement takes place up to the abutment of the circumference portion 37 against the collar face 36. Thus, the sealing sleeve 17 projects out of the face 23. After this, no displacement takes place as long as there is contact with circumference potion 37. The circumference portion 37 merges into a stopper face, which is provided with a further abutment 39. Because of this, further movement of the actuation element 9 and thus the switching shaft 10 is prevented. The first adjustment path is represented by the contact of the setting face 34 with the collar face 36. The second adjustment path, on which the circumference portion 37 is supported on the collar face 36, is provided for the displacement of the first valve 8. Also, displacement of the second valve 27 into the open position depends on this movement after the switching shaft 10 has travelled the idling path or free travel relative to the actuation element. The final position, which is limited by the second abutment 39, can also provide a levelled (flat portion) portion subsequently connected to the circumference portion 37, to secure a definite position of the actuation element 5.

Figure 6:
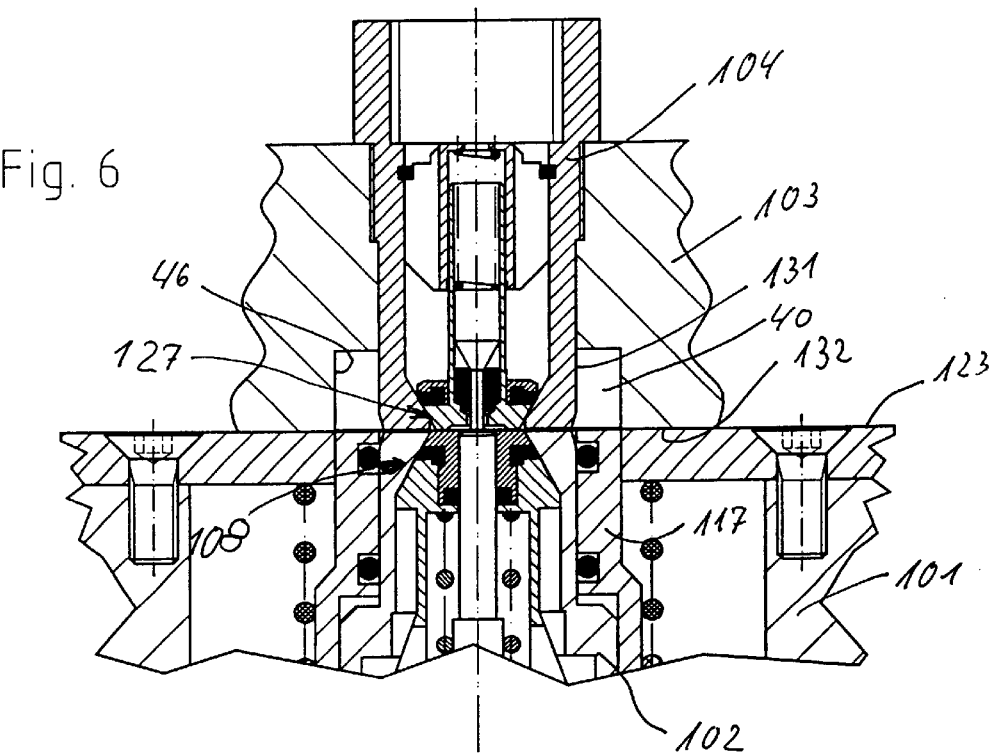
FIG. 6 is a cross-sectional view of an embodiment where the block housings are supported relative to each other.

FIG. 6 shows a modified embodiment. Here, the same parts, which have been described in connection with the FIGS. 2–5, are provided with reference numerals which have been increased numerically by the number 100 compared to the parts of FIGS. 2 and 3. In respect to the description of these parts it is referred to the description of the embodiment of FIGS. 2–5.

The deviations will be described in the following. The difference between the embodiment of FIGS. 2–5 is that the second block housing 103, with its front face 132, abuts directly with the face 123 of the cover plate of the first block housing 101. A bore 46 is provided in the second block housing 103 to provide a gap for the sealing sleeve 117. An annular chamber 40 is provided to receive the sealing sleeve 117 during the displacement from the position shown in FIG. 6 to an advanced (projected) position, which for example corresponds to the position, shown in connection with FIG. 3.

Figure 7:
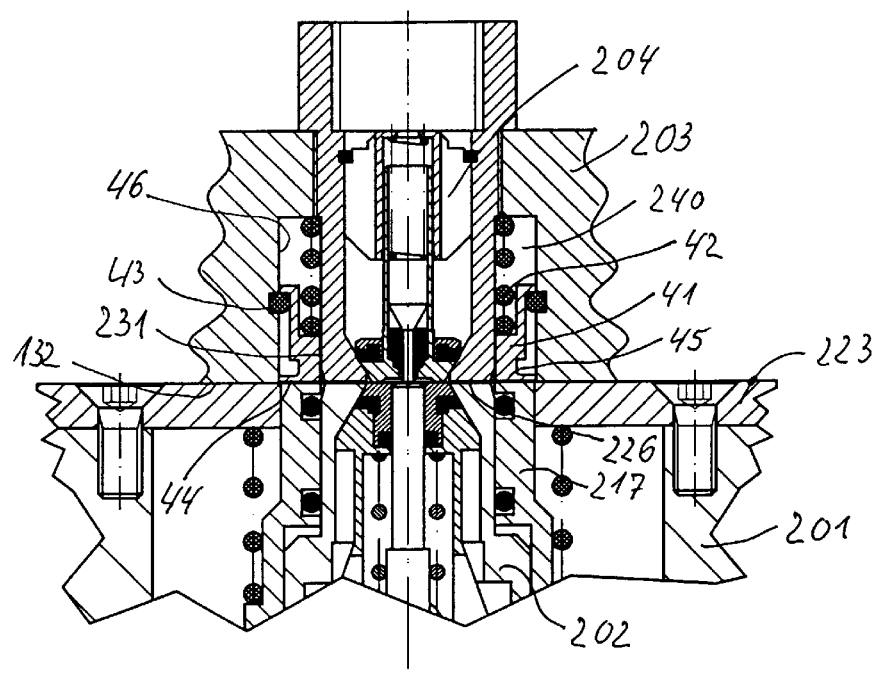
FIG. 7 is a cross-sectional view like FIG. 6, however the annular chamber is extended and receives a protective sleeve.
Figure 8:
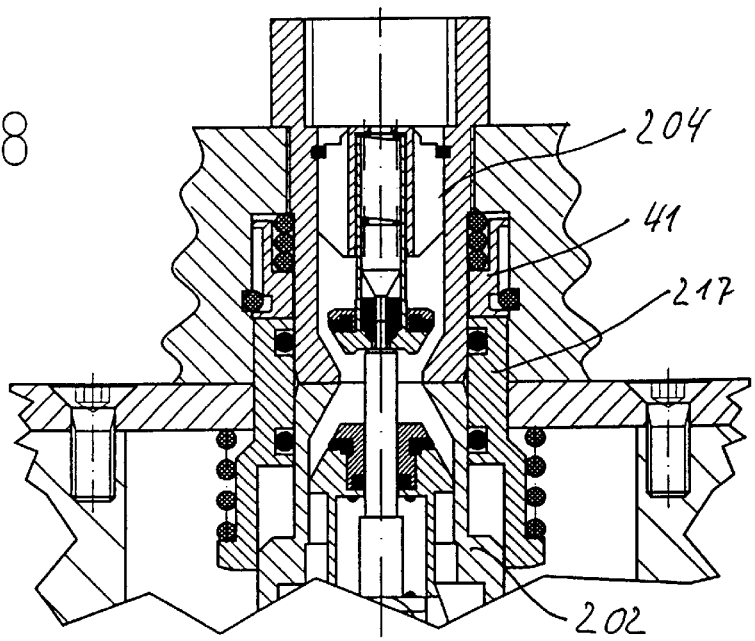
FIG. 8 is a cross-sectional view like FIG. 7 with the sealing sleeve displaced into its projected position and the protective sleeve extending into the annular chamber.

In FIGS. 7 and 8, an embodiment is shown where the annular chamber 40, provided in FIG. 6, is additionally used to take-up a protective sleeve 41. The protective sleeve 41 is adjustably supported on the second cylindrical face 231. The annular chamber 240 is correspondingly deeper. The protective sleeve 41 is acted upon by a spring 42. The spring 42 pushes the protective sleeve into a projected position. The end face 44 of the protective sleeve 41 contacts the second front face 226. The movement of the protective sleeve 41 is limited by a retaining ring 43. During a displacement of the sealing sleeve 217, starting from the position shown in FIG. 7 into the position shown in FIG. 8, the end face 44 is acted upon by the front support face 45 of the sealing sleeve 217 and is displaced deeper into the annular chamber 240.

The further components of the two coupling members 202, 203 correspond in the design to those of FIGS. 2–5. Thus, their respective description is found with the description of FIGS. 2–5. For the essential components reference numerals are given, which, compared to those of FIGS. 2 and 3, for same components the number has been increased by 200 or 100, respectively, in respect to the design of the annular chamber of FIG. 6.

While the above detailed description describes the preferred embodiment of the present invention, the invention is susceptible to modification, variation and alteration without deviating from the scope and fair meaning of the subjoined claims.

What is claimed is:

1. A coupling assembly for coupling several hydraulic pipes, comprising:
   a number of single couplings corresponding to a number of to be connected pipes, each coupling including a first coupling member having a first valve, a first front face to which the first valve is to be opened, and a first cylindrical face starting from the first front face, an actuating element by which the first valve is transferable into an open position, a sealing sleeve with a bore on the first cylindrical face, said sealing sleeve adjustable in the direction of a longitudinal axis and displaceable by the actuating element from a retracted position into a projected position partly projected beyond the first front face;
   a second coupling member including a second valve, a second front face to which the second valve is to be opened, a second cylindrical face at least partly covered by the sealing sleeve in the projected position;
   a first block housing for attaching the first coupling members;
   a second block housing for attaching the second coupling members in a position corresponding to the first coupling members and said second block housing attachable to the first block housing.

2. The coupling assembly according to claim 1, wherein the actuating element over a first adjusting path only adjusts the sealing sleeve to the projected position and over a subsequent second adjusting path displaces the first valve into the open position.

3. The coupling assembly according to claim 1, wherein the sealing sleeve in its bore has two sealing rings arranged at a distance to each other, for sealing towards the first cylindrical face and the second face.

4. The coupling assembly according to claim 1, wherein the sealing sleeve is impinged by an adjustment spring for taking up its retracted position.

5. The coupling assembly according to claim 1, wherein a cam disc impinging a collar of the sealing sleeve is attached to the actuating element.

6. The coupling assembly according to claim 1, wherein the sealing sleeve in the projected position engages an annular chamber, formed between the second cylindrical face of the second coupling member and a bore of the second block housing.

7. The coupling assembly according to claim 6, wherein a protective sleeve is adjustably inserted in the annular chamber having an end face lying flush with the second front face in the projected position and being impinged by a spring to take-up the projected position and wherein the protective sleeve is displaceable by the sealing sleeve into a retracted position.

8. The coupling assembly according to claim 1, wherein the first block housing is divided in parts and has a cover plate and wherein the second block housing abuts the cover plate of the first block housing in the connected condition of the block housings.

* * * * *